United States Patent [19]
Bradley

[11] Patent Number: 5,931,993
[45] Date of Patent: Aug. 3, 1999

[54] COMPOSITION FOR FORMING A BLACK, ADHERENT COATING ON A METAL SUBSTRATE

[75] Inventor: Johnny LaDell Bradley, Ozark, Ala.

[73] Assignee: Globe Motors

[21] Appl. No.: 08/939,267

[22] Filed: Sep. 29, 1997

Related U.S. Application Data

[62] Division of application No. 08/682,928, Jul. 16, 1996, Pat. No. 5,704,995.

[51] Int. Cl.$^6$ ....................................................... C09K 3/00
[52] U.S. Cl. ..................................... 106/14.11; 106/14.41; 106/14.44
[58] Field of Search ............................. 106/14.11, 14.41, 106/14.44

[56] References Cited

U.S. PATENT DOCUMENTS

| | | | |
|---|---|---|---|
| 3,455,746 | 7/1969 | Kong | 148/6.15 |
| 3,849,141 | 11/1974 | Palm et al. | 106/7 |
| 3,895,969 | 7/1975 | Miller | 148/6.2 |
| 3,932,198 | 1/1976 | Schneider | 148/6.2 |
| 3,960,610 | 6/1976 | Steinbrecher et al. | 148/6.14 R |
| 3,990,920 | 11/1976 | De Ridder et al. | 148/6.2 |
| 4,103,049 | 7/1978 | Nishida et al. | 427/341 |
| 4,130,431 | 12/1978 | Kogure | 106/14.33 |
| 4,325,749 | 4/1982 | Barlet | 148/6.14 R |
| 4,636,264 | 1/1987 | Schellenberg et al. | 148/6.2 |
| 4,719,038 | 1/1988 | Sobata et al. | 252/511 |
| 4,755,434 | 7/1988 | Fujii et al. | 428/461 |
| 4,755,435 | 7/1988 | Fujii et al. | 428/461 |
| 4,799,959 | 1/1989 | Fourez et al. | 106/1.16 |
| 4,931,317 | 6/1990 | Shima et al. | 427/385.5 |
| 4,975,337 | 12/1990 | Hyner et al. | 428/648 |
| 5,275,892 | 1/1994 | Hyner et al. | 428/648 |
| 5,308,709 | 5/1994 | Ogino et al. | 428/623 |
| 5,470,613 | 11/1995 | Rodzewich | 427/388.1 |
| 5,510,010 | 4/1996 | Kobor | 204/488 |

FOREIGN PATENT DOCUMENTS

| | | |
|---|---|---|
| 291606 | 11/1988 | European Pat. Off. . |
| 489427 | 6/1992 | European Pat. Off. . |
| 2136454 | 9/1984 | United Kingdom . |

OTHER PUBLICATIONS

Proc. AESF Annu. Tech. Conf. (1986), 73 rd (Sess.F), Paper F–5, Lindemann et al.

*Primary Examiner*—Erma Cameron
*Attorney, Agent, or Firm*—Biebel & French

[57] ABSTRACT

A black uniform coating with excellent adhesion, bend flexibility, and corrosion resistant characteristics can be formed on metals such as aluminum and its alloys, zinc and its alloys, and copper and its alloys such as brass, with the deposition of zinc and antimony compounds through a base solution and sealed with a water base sealer. The water based sealer comprises an organic film forming resin, an organic solvent, and emulsifying agents and an alkyd resin.

9 Claims, No Drawings

5,931,993

COMPOSITION FOR FORMING A BLACK, ADHERENT COATING ON A METAL SUBSTRATE

This is a divisional of application Ser. No. 08/682,928 filed on Jul. 16, 1996, now U.S. Pat. No. 5,704,995.

FIELD OF THE INVENTION

The present invention relates to a method and composition for the formation of a black uniform coating on the surface of various metals, and particularly of various metals such as aluminum and its alloys, zinc and its alloys, and copper and its alloys, such as brass, including materials with surfaces of these alloys produced by plating or other methods. The process has been found to be particularly effective at forming a room temperature two step flexible, uniformly black corrosion resistant coating on the surfaces of the previously mentioned metals.

BACKGROUND OF THE INVENTION

Methods for the formation of black coatings or films on the surface of various metals are currently available. The methods vary with the particular type of metal, e.g., ferrous metals, stainless steels, copper and its alloys, zinc and its alloys, and aluminum and its alloys. The composition of the treatment solution and the treatment conditions vary from case to case. As reported in the background of U.S. Pat. No. 4,931,317, it has been previously known to provide a method of forming a black coating with an aqueous resin containing solution followed by baking to produce a coating of the desired weight. The aqueous solution contains a hexavalent chromium compound, a reducing agent and a water soluble resin.

In the treating of many aluminum or aluminum alloy articles the more common procedure is to first apply a conversion coating such as a chromium based coating and thereafter apply a black paint. The first step creates a corrosion resistant conversion coating. The second step of applying paint is virtually nothing more than a decorative and aesthetic step. Such two step processes require extra equipment and waste disposal procedures. Coatings such as those described in the background of U.S. Pat. No. 4,931,317 also require ovens to bake the coated metal to form the coating thereon.

The '317 disclosure itself teaches a method and composition for the formation of a black coating on the surface of various metals by coating and subsequent baking of a treatment solution containing ferrous metal ions, hexavalent chromium, trivalent chromium and a film forming polymer dissolved or dispersed in water. The black nature of the coating is due to the concentration of hexavalent chromium and metal salts (Co, Fe and Ni) in the solution. This disclosure requires that an air knife be used in the process to remove excess coating material from the surface of the substrate as well as the need for ovens in order to cure the coating after it has been applied to the substrate.

U.S. Pat. No. 5,470,613 discloses the composition and method of forming a single step no rinse black conversion coating. It has been found that this process can not be applied to surfaces of various substrates other than aluminum and its alloys. Also, it has been found that the so-called process solution is not stable and, in the long run, this solution breaks down and/or separates into a polymer and hexavalent chromium paste.

SUMMARY OF THE INVENTION

Throughout this description, except in the operating examples or where otherwise explicitly indicated, all numbers specifying quantities of materials or conditions of reaction or use are understood as modified by the word "about".

It has been found that a black surface coating can be formed not only on aluminum materials, but also on a variety of other materials by coating the surface with a dry loose powdery layer of zinc and antimony from a blackening treatment (i.e. solution or dispersion) and sealing the coating with a sealing treatment containing water, styrene acrylate copolymer, ethylene glycol monobutyl ether, and an alkyd resin. More specifically, the preferred sealing treatment comprises the following ingredient percentages (percentages are given on a weight basis):

| INGREDIENT | PERCENTAGE |
| --- | --- |
| Water | 79 |
| Ethylene glycol monobutyl ether (2-butoxyethanol) | 5.7 |
| N-methylpyrrolidone | 0.5 |
| Styrene acrylate copolymer | 8 |
| Alkyd resin | 6 |
| Polyethylene glycol based surfactant | <1 |
| Carboxylic acid | <1 |
| Polyethylene wax | <1 |
| Zinc chromate (Cr + 6) | <0.5 |

The black coating is formed by using a sodium hydroxide base solution containing zinc and antimony compounds. More specifically, the blackening solution preferably consists of Hubbard Hall's BLACK MAGIC RT-A3 antimony-zinc dispersion. The ingredients of this product purportedly include:

| INGREDIENT | PERCENTAGE |
| --- | --- |
| Sodium hydroxide | 30–40 |
| Zinc compounds | 10 |
| Antimony compounds | 5 |
| Liquid Carrier | Remainder |

DETAILED DESCRIPTION OF THE INVENTION

In accordance with the invention, a dry, black, adherent protective coating is formed on the desired metallic substrate. The coating may advantageously be applied to a variety of metals including iron, copper, aluminum, tin, zinc and alloys thereof. The coating has proven especially effective on aluminum, copper and brass substrates.

After the requested metal substrate has been precleaned, it is contacted with a blackening solution or dispersion (i.e. treatment) comprising a combination of zinc and antimony particles in a suitable carrier liquid, such as water. Preferably, the zinc and antimony components are present in this elemental powdered form although they could also be present in salt form such as in nitrate form or as carbonates. Additionally, they could be present as oxides. Immersion of the substrate in this blackening treatment is normally conducted under basic conditions. The amount of zinc present relative to antimony may be on the order of about 4–1:1 with zinc preferably present in an amount by weight, relative to antimony of about 2:1.

After application of the blackening treatment, the substrate is rinsed and, preferably, subjected to a acid based chromate solution or dispersion to provide enhanced corrosion protection. Any source of hexavalent chromium may be mentioned as exemplary for such treatment. Included are such compounds as chromic acid, potassium dichromate, magnesium dichromate, potassium chromate, sodium chromate, zinc chromate, and aluminum chromate, sodium chromate dihydrate, sodium chromate anhydrous, sodium chromate tetrahydrate, sodium chromate hexahydrate, sodium chromate decahydrate, and ammonium dichromate.

Solutions which contain trivalent chromium in addition to hexavalent chromium may also be mentioned. These may be prepared by partially reducing solutions containing hexavalent chromium with suitable reducing agents. For example, the addition of formaldehyde to a chromic acid solution will reduce a portion of the hexavalent chromium present to its trivalent form.

After application of the chromate treatment to the metal part, the part may be subjected to cold water and hot water rinses followed by ambient or forced air drying. The thus treated, and, blackened part is then immersed in a specially prepared sealing treatment.

The sealing treatment is a two part liquid solution wherein the first part is an emulsion comprising an organic film forming resin component such as an emulsified acrylic, vinyl acetate, styrene or phenolic polymer that forms a coherent, durable film upon drying. Acrylic polymer films are preferred. Such film forming resin components are commercially available under the "RHOPLEX" or "NEOCRYL" trademarks from Rohm and Haas and ICI respectively. Styrene/acrylic copolymers are most preferred.

The first part also includes an organic solvent such as the "CELLOSOLVE" ethylene glycol ethers sold by Union Carbide. These are all well known and commercially available mono or dialkyl ethers of ethylene glycol. Accordingly, such solvents can comprise ethylene glycol monobutyl ether, ethylene glycol monoethyl ether acetate, ethylene glycol monobutyl ether acetate, ethylene glycol monoethyl ether, ethylene glycol dibutyl ether, ethylene glycol monohexyl ether, ethylene glycol monomethyl ether, ethylene glycol monomethyl ether acetate, ethylene glycol monophenyl ether, etc.

Additionally, a plasticizer such as N-methylpyrrolidone can also be a constituent of the first part sealing solution. An additional film forming member such as an alkyd resin may also be included. The first part sealing treatment may be supplied in emulsion form with the use of suitable emulsifying agents and water present.

As to the emulsifying agents which may be present, these include the polyethylene glycol condensates of the formula $H(OCH_2CH_2)_nOH$ that may vary in weight from about 200–10,000. Additionally other emulsifiers such as soaps and polyethylene waxes may be mentioned.

The first part sealing liquid is mixed with a second part sealing liquid, the latter of which includes lacquers. In the preferred form of the invention, a hexavalent chromium source, such as those referred to above may also be included in the second part. After the first and second parts are mixed, additional water is added. The first and second parts are mixed in a volumetric ratio of first part:second part of from about 1–4:4–1 with preliminary results indicating a preference for mixing of about 3:1 part one:part two. Water is then added to these mixed part one and part two components to result in the sealing treatment into which the desired metal part is immersed.

Exemplary first part liquids are listed below.

| First Part | % by weight |
| --- | --- |
| Film Forming Resin Component | 1–40% |
| Organic Solvent | 1–10% |
| Plasticizer | 1–2% |
| Alkyd Resin | 1–40% |
| Emulsifying Agents | 1–5% |
| Water | Remainder |

The invention will now be further described in conjunction with the following examples, which are to be regarded as being illustrative of the invention and not as a limitation thereof.

EXAMPLES a) Preparation—Black treatment solutions were prepared by adding water to the basic antimony—zinc dispersion sold under the trademark BLACK MAGIC RT-A3 available from Hubbard-Hall, Inc, Waterbury, Conn. This product has been described as a clear, slightly viscous liquid having a pH in excess of 12 which comprises about 30–40% NaOH, 10% elemental zinc in blue powder form, 5% antimony black (elemental antimony). This product is soluble in water and has a specific gravity of 1.5 @70° F. The addition of water to the product caused an exotherm. The resulting solution was then allowed to cool.

The requisite metal substrate was pre-cleaned and then immersed in the black treatment solution for a period of about 1 ½–2 minutes followed by a cold water rinsing of the part for about 2–4 minutes. In certain cases, the part was immersed in a zinc chromate containing bath (as is indicated in the following table) for a period of about 10–20 seconds, to impart increased anti-corrosion properties to the coating.

The thus coated part was subjected to a quick cold water then hot water rinse with excess water blown off the part.

Next, the part was immersed in a sealing treatment liquid for a period of about 1–2 minutes. The sealing treatment was prepared by mixing commercially available RUST PEL 66 ESMP-1 product (available from Hubbard-Hall—see above) and the commercially available "SUPER-SHIELD" product from Hubbard-Hall. RUST PEL 66ESMP-1 product has been described as a milky white liquid having a specific gravity of 1.005 @70° F. It is a water reducible acrylic emulsion containing butyl cellosolve, 1-methyl 2-pyrrolidinone, ammonium hydroxide, a styrene/acrylic polymer, and alkyd resin. The SUPER-SHIELD product is a lacquer based product available from Hubbard-Hall. The lacquer includes minor amounts of hexavalent chromium.

The "RUST PEL 66ESMP-1" and "SUPER-SHIELD" products were first mixed together before water was added to form the sealing treatment in accordance with the invention. The resulting sealing treatment had the following composition (% by volume):

| | |
| --- | --- |
| RUST PEL 66ESMP-1 product | 61% |
| SUPER-SHIELD product | 19.6 |
| Water | 19.4 |

After the metal parts were immersed in the sealing treatment for about 1–2 minutes, they were then dried in air for a period of about 5–10 minutes with excess sealing treatment blown off. Dry, black coated substrates were provided as a result and were subjected to the efficacy tests that are described below.

b) Comparative Preparation—Procedures similar to those reported in (a) above were used to immerse metal substrates into comparative black treatment and sealing treatment liquids as specified below.

c) List of examples and comparative examples prepared. In accordance with (a) and (b) the following examples and comparative examples were prepared.

| Metal Substrate | Number | Blackening Treatment | Chromate | Sealing Treatment |
|---|---|---|---|---|
| 380A A1 | C-1 | BLACK MAGIC RT-A-3 | — | RUST PEL 47-14 |
| 380A A1 | C-2 | BLACK MAGIC RT-A-3 | — | RUST PEL 51 |
| 380A A1 | C-5 | BLACK MAGIC RT-A-3 | IRIDITE 5-3 | RUST PEL 47-14 |
| 380A A1 | C-6 | BLACK MAGIC RT-A-3 | IRIDITE 5-3 | RUST PEL 51 |
| 380A A1 | C-7 | ALUMINA BLACK A 15 | — | SATIN-SHIELD 10 |
| 380A A1 | C-8 | ALUMINA BLACK A 15 | IRIDITE 14-2 | SATIN-SHIELD 10 |
| 380A A1 | C-9 | ALUMINA BLACK A 15 | — | RUST PEL 47-14 |
| 380A A1 | C-10 | ALUMINA BLACK A 15 | IRIDITE 14-2 | RUST PEL 47-14 |
| 380A A1 | C-11 | ALUMINA BLACK A 15 | — | RUST PEL 51 |
| 380A A1 | C-12 | ALUMINA BLACK A 15 | IRIDITE 14-2 | RUST PEL 51 |
| Examples | | | | |
| 380A A1 | 3 | BLACK MAGIC RT-A3 | — | GLOBE SEAL [prepared as under (a) above] |
| 380A A1 | 4 | BLACK MAGIC RT-A3 | IRIDITE 5-3 | GLOBE SEAL [prepared as under (a) above] |
| Copper | 13 | BLACK MAGIC RT-A3 | — | GLOBE SEAL [prepared as under (a) above] |
| Zinc | 14 | BLACK MAGIC RT-A3 | — | GLOBE SEAL [prepared as under (a) above] |
| Brass | 15 | BLACK MAGIC RT-A3 | — | GLOBE SEAL [prepared as under (a) above] |

ALUMINA BLACK A-15 solution is a dilute aqueous acid solution comprising $H_2SeO_3$, $CuSO_4 \cdot 5H_2O$, $(NH_4)_2MoO_4$, $ZnSO_4$, $NaF$ and water available from Birchwood Chemicals.

IRIDITE 5-3 mixture is a chromic acid mixture available from MacDermid, Waterbury, Conn.

IRIDITE 14-2 mixture is a chromic acid mixture available from MacDermid, Waterbury, Conn. The product contains 30–60% chromic acid; 10–30% barium nitrate, and 10–30% sodium silico-fluoride.

RUST PEL 47-14 mixture is an organic petroleum hydrocarbon available from Hubbard-Hall. It comprises about 86% stoddard solvent CAS 8052-41-3; about 11% barium compound CAS 7440-39-3.

RUST PEL 51 mixture is an organic petroleium hydrocarbon available from Hubbard-Hall. It comprises about 80% stoddard solvent CAS 8052-41-3; 10% barium compound CAS 7440-39-3, dipropylene glycol mono methyl ether and propylene glycol methyl ether.

SATIN-SHIELD 10 emulsion is an aqueous wax/polymer emulsion comprising waxes, styrene/acrylic polymers, amine/fatty acid soap, formaldehyde and water, available from Birchwood Chemicals.

GLOBE SEAL is made in accordance with (a) above and is a mixture of RUST PEL 66ESMP-1 product, SUPER-SHIELD emulsion and water.

d. Efficacy Tests

1. Adherence efficacy and corrosion resistance of the coatings were tested in accordance with Mil-C-5541 and Mil-A-8625 under salt fog and wet tape conditions. Additional tests under 100%-humidity-ambient temperature conditions were also undertaken. Results are shown in Tables 1–3.

TABLE 1

| | 5% Salt Fog | | | |
|---|---|---|---|---|
| | 168 hrs. | discoloration | 336 hrs. | discoloration |
| C-1 | fail | fail | — | — |
| C-2* | fail | fail | — | — |
| 3 | pass | pass | fail | fail |
| 4 | pass | pass | pass | pass |
| C-5 | fail | fail | — | — |
| C-6* | pass | pass | fail | fail |
| C-7** | fail | fail | — | — |
| C-8** | fail | fail | — | — |
| C-9 | fail | fail | — | — |
| C-10 | fail | fail | — | — |
| C-11* | fail | fail | — | — |
| C-12* | fail | fail | — | — |
| 13 | pass | pass | pass | pass |
| 14 | pass | pass | fail | fail |
| 15 | pass | pass | pass | pass |

TABLE 2

| | WET TAPE TEST | | | | | |
|---|---|---|---|---|---|---|
| | 24 hrs. | dis-coloration | 168 hrs. | dis-coloration | 336 hrs. | dis-coloration |
| 3 | pass | pass | pass | pass | pass | pass |
| 4 | pass | pass | pass | pass | pass | pass |
| C-6* | fail | fail | — | — | — | — |
| C-7** | pass | pass | fail | fail | — | — |
| C-8** | pass | pass | fail | fail | — | — |
| 13 | pass | pass | pass | pass | pass | pass |
| 14 | pass | pass | pass | pass | pass | pass |
| 15 | pass | pass | pass | pass | pass | pass |

TABLE 3

| | 168 hrs. | dis-coloration | 336 hrs. | dis-coloration | 500 hrs. | dis-coloration |
|---|---|---|---|---|---|---|
| 3 | pass | pass | pass | pass | pass | pass |
| 4 | pass | pass | pass | pass | pass | pass |
| C-6* | fail | fail | — | — | — | — |
| C-7** | pass | pass | fail | fail | fail | fail |
| C-8** | pass | pass | pass | pass | fail | fail |
| 13 | pass | pass | pass | pass | pass | pass |
| 14 | pass | pass | pass | pass | pass | pass |
| 15 | pass | pass | pass | pass | pass | pass |

100% HUMIDITY @ AMBIENT TEMPERATURE

2. Bend Tests

The coated substrates were subjected to bend tests wherein coating adhesion was assessed after a coated Al substrate (1"×3"33 3/16") was bent around a mandrel having a radius as specified in the following Table 4.

TABLE 4

BEND TEST

| | 1/2" radius | crack | 1/4" radius | crack | 1/8" radius | crack |
|---|---|---|---|---|---|---|
| 3 | | pass | | pass | | pass |
| 4 | | pass | | pass | | pass |
| C-6* | | fail | | fail | | fail |
| C-7** | | fail | | fail | | fail |
| C-8** | | pass | | fail | | fail |
| 13 | | pass | | pass | | pass |
| 14 | | pass | | ***fail | | — |
| 15 | | pass | | pass | | pass |

In Tables 1–4 above, *indicates that the sealer used in the blackening process remained oily and was unacceptable since it was not dry to the touch. indicates that these samples met the desired dry to the touch requirement and were allowed to participate in testing part Table 1. *indicates that the sample panel could not be bent to this dimension without having the panel fracture into the substrate 1.

e. Discussion of Efficacy Tests

The above results indicate that the black coatings produced in accordance with the inventive methods consistently pass the Mil-C-5541 and Mil-A-8625 salt and wet tape tests. Additionally, the 100% humidity-ambient temperature tests were also passed by the coatings made in accordance with the invention. This is surprising since many of the conventional black coatings pass the humidity but not the salt tests.

It is to be noted that the steps of contacting the requisite metal parts with treatment solutions may be effected via immersion, rolling, spraying or dipping the metal part into the requisite treatment bath.

Additionally, preliminary tests indicate that the best results are obtained when, prior to application of the antimony-zinc blackening treatment, the parts are subjected to a pre-cleaning step or steps in which for example the parts may be vapor degreased for about 1–3 minutes, then immersed in a mildly alkaline liquid cleaner, such as Hubbard-Hall Inc.'s cleaner P-732 for about 2–5 minutes. This pre-cleaning step may then be followed by a cold water rinse for about 1–3 minutes with the part then being immersed in a caustic etch solution for about 5–20 seconds. Preferably, an pursuant to this pre-cleaning function, the part may be immersed in cold water for about 1–3 minutes followed by immersion in a nitric acid treatment to remove oxides. The metal part may then be double cold water rinsed for about 2–6 minutes prior to immersion in the aforementioned blackening treatment.

The methods in accordance with the invention provide a black, adherent coating over the requisite metal substrate in contrast to many conventional products in which an oily or slippery film is provided. Moreover, none of the process steps, in accordance with the invention include any heat treatment or baking steps. All of the steps of the invention are preferably carried out at room temperature. Accordingly, the need for excessive heating equipment is eliminated.

The coatings in accordance with the invention are very thin on the order of about 0.0001–0.005", preferably 0.0005 in thickness. An oil-free dry to the touch surface is provided in accordance with the invention to which sealants and adhesives will readily adhere.

While this invention has been described with respect to particular embodiments thereof, it is apparent that numerous other forms and modifications of this invention will be obvious to those skilled in the art. The appended claims in this invention generally should be construed to cover all such obvious forms and modifications which are within the true spirit and scope of the present invention.

What is claimed is:

1. A composition comprising a mixture of:
   a first sealing liquid including
      an organic film forming resin component, from about 1 to about 40 percent by weight;
      an organic solvent selected from the group consisting of mono or dialkyl ethers of ethylene glycol and mixtures thereof, from about 1 to about 10 percent by weight;
      an alkyd resin, from about 1 to about 40 percent by weight;
      a plasticizer, from about 1 to about 2 percent by weight;
      emulsifying agents, from 1 to 5 percent by weight; and
      water, remainder;
   a second sealing liquid including
      a lacquer component;
      hexavalent chromium; and
      water,
      wherein the first sealing liquid is mixed with the second sealing liquid in a volumetric ratio of first liquid-:second liquid of from about 1–4:4–1.

2. The composition of claim 1 wherein said organic film forming resin component comprises styrene/acrylic copolymer.

3. The composition of claim 2 wherein said organic solvent comprises ethylene glycol monobutyl ether.

4. The composition of claim 3 wherein said plasticizer comprises N-methylpyrrolidone.

5. The composition of claim 4 wherein said emulsifying agents comprise polyethylene glycol condensates of the formula $H(OCH_2CH)_nOH$ that vary in weight from about 200 to 10,000.

6. The composition of claim 1 wherein the first sealing liquid is in an amount about 61 percent by volume, and the second sealing liquid is in an amount about 19.6 percent by volume.

7. Composition comprising water in an amount of about 79 percent by weight, 2-butoxyethanol in an amount of about 5.7 percent by weight, N-methylpyrrolidone in an amount of about 0.5 percent by weight, a styrene/acrylic copolymer in an amount of about 8 percent by weight, an alkyd resin in an amount of about 6 percent by weight, the remainder comprising polyethylene glycol based surfactant, carboxylic acid, polyethylene wax, and hexavalent Cr.

8. Sealing composition comprising:
1) a first sealing composition comprising, in aqueous emulsion,
   a) an organic film forming resin;
   b) an organic solvent; and
   c) alkyd resin, and
2) a second sealing component comprising lacquer and hexavalent chromium; said first 1) and second 2) component being mixed in a volumetric ratio of about 1–4:4–1.

9. Sealing composition comprising:
1) a first scaling component comprising, in aqueous emulsion,
   a) 1–40 wt % of an organic film forming resin;
   b) 1–10 wt % of an organic solvent; and
   c) 1–40 wt % of alkyd resin; and
2) a second scaling component comprising lacquer and hexavalent chromium; said first 1) and second 2) components being mixed in a volumetric ratio of about 1–4:4–1.

* * * * *

UNITED STATES PATENT AND TRADEMARK OFFICE
CERTIFICATE OF CORRECTION

PATENT NO. : 5,931,993
DATED : August 3, 1999
INVENTOR(S) : Johnny LaDell Bradley It is certified that error appears in the above-indentified patent and that said Letters Patent is hereby corrected as shown below:

Claim 9 - line 6, after "second" take out -scaling- and insert --sealing--.

Signed and Sealed this

Eighteenth Day of January, 2000

*Attest:*

Q. TODD DICKINSON

*Attesting Officer*     *Commissioner of Patents and Trademarks*